June 15, 1965 G. F. QUITTNER 3,189,842

SELF ADJUSTING THRESHOLD CONTROL

Filed June 22, 1962 2 Sheets-Sheet 1

INVENTOR.
GEORGE F. QUITTNER
BY Richard MacCutcheon
ATTY.

SELF ADJUSTING THRESHOLD CONTROL

Filed June 22, 1962 2 Sheets-Sheet 2

INVENTOR.
GEORGE F. QUITTNER
BY Richard MacCutcheon
ATTY.

United States Patent Office 3,189,842
Patented June 15, 1965

3,189,842
SELF ADJUSTING THRESHOLD CONTROL

George F. Quittner, Cleveland Heights, Ohio, assignor to Assembly Products, Inc., Chesterland, Ohio, a corporation of Ohio Filed June 22, 1962, Ser. No. 204,317
3 Claims. (Cl. 330—51)

This invention relates to an automatic threshold control useful as a clipper for removing noise of variant level and passing (and amplifying) sought for signals.

In flaw finding equipment installed in production lines involving continuous sample motion, it is a characteristic condition that small signals are continuously generated as a result of vibration, insignificant sample variations, and the like, comprising a statistical noise distribution. When a flaw arrives at the testing location, however, a relatively larger signal appears; this will be true somewhere in the signal path even if, for example, the system is such that flaws cause only phase shifts, because these will be converted to amplitude changes in the signal processing line by phase sensitive detection means in order to achieve desired final output action.

The flaw signal may consist of a negative pulse, or a positive pulse, or a series of one or the other or a series of alternations. In some applications it is useful to be able to distinguish between these types while in others it is not. In general therefore, it is desirable to be able to handle any and all of such flaw signals, and with later processing perform any selection desirable.

It is always desirable to reduce the effects of random noise on final output signaling devices, and this has been done with a threshold device, typically a normally cut-off amplifier tube, which conducts signal only when that signal exceeds a pre-set bias level. In industrial practice, however, such an arrangement has a serious weakness because it does not take into account typical variations in noise level due to changing operating and sample conditions. If, in a plant installation, the device is adjusted correctly initially and then the noise level rises, the amplifier output will be constantly and falsely energized due to noise pulses. On the other hand, if the noise decreases from that extant at time of initial manual adjustment, the device will now let no signals through which do not exceed the previously set bias level.

It is an object of the present invention to provide simple means for overcoming the above mentioned difficulties.

In accordance with one aspect of the present invention I meet this object by providing a push-pull amplifier arrangement having a setable threshold together with means for sampling the input signal thereto, and means for amplifying and rectifying and integrating the sample, and connection means for applying the integrated result as controlling bias to the push-pull amplifier.

Other objects and advantages will become apparent and the invention may be better understood from consideration of the following description taken in connection with the accompanying drawing, in which.

Figure 1:
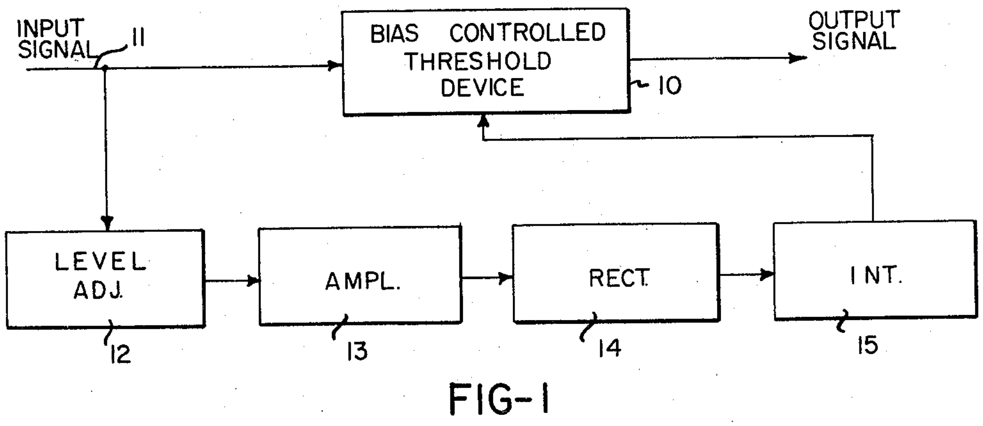
FIG. 1 is a block diagram of a preferred embodiment.

Referring now to FIG. 1 a bias controlled threshold device 10 is fed with an input signal 11 (comprising both wanted signals and unwanted "noise" of variant level). The input signal is sampled and with a level adjustment 12 interposed is fed to an amplifier 13 the output of which is rectified as indicated by block 14 and integrated as indicated at 15, and the integrated output is fed as bias to set the threshold of the device 10. The wanted signals may be derived in known conventional manner, see for example my co-pending patent application, Serial No. 187,875, filed April 16, 1962, and assigned to the assignee of the present invention.

Figure 2:
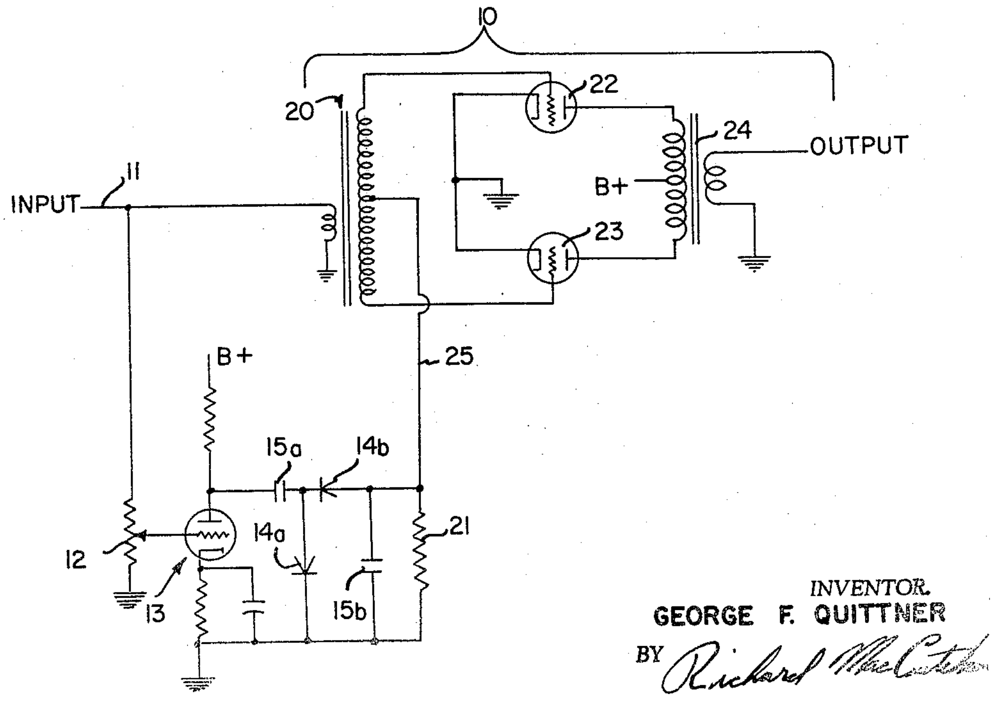
FIG. 2 is a circuit diagram for such a preferred embodiment.

As seen in FIG. 2 the signal from 11, including unwanted random noise, is fed to the primary of an input transformer 20 and also to a manually adjustable voltage divider 12. A fraction of the input signal selected by the tap position of voltage divider 12 is amplified by a triode 13 and rectified by means of diodes 14*a* and 14*b*. Capacitors 15*a* and 15*b* form an integrator for the rectified signal. A grid resistor 21 provides a controlled integrator discharge rate and return path for the grids of two setable threshold amplifier tubes 22 and 23. The input of tubes 22 and 23 is derived from the secondary of transformer 20 while the output of these tubes is taken to primary of a transformer 24 whose secondary produces signal for further signal processing stages, readout, alarm actuation, operation of a paint sprayer to indicate a flaw, or whatever is desired.

Figures 3, 4, 5:
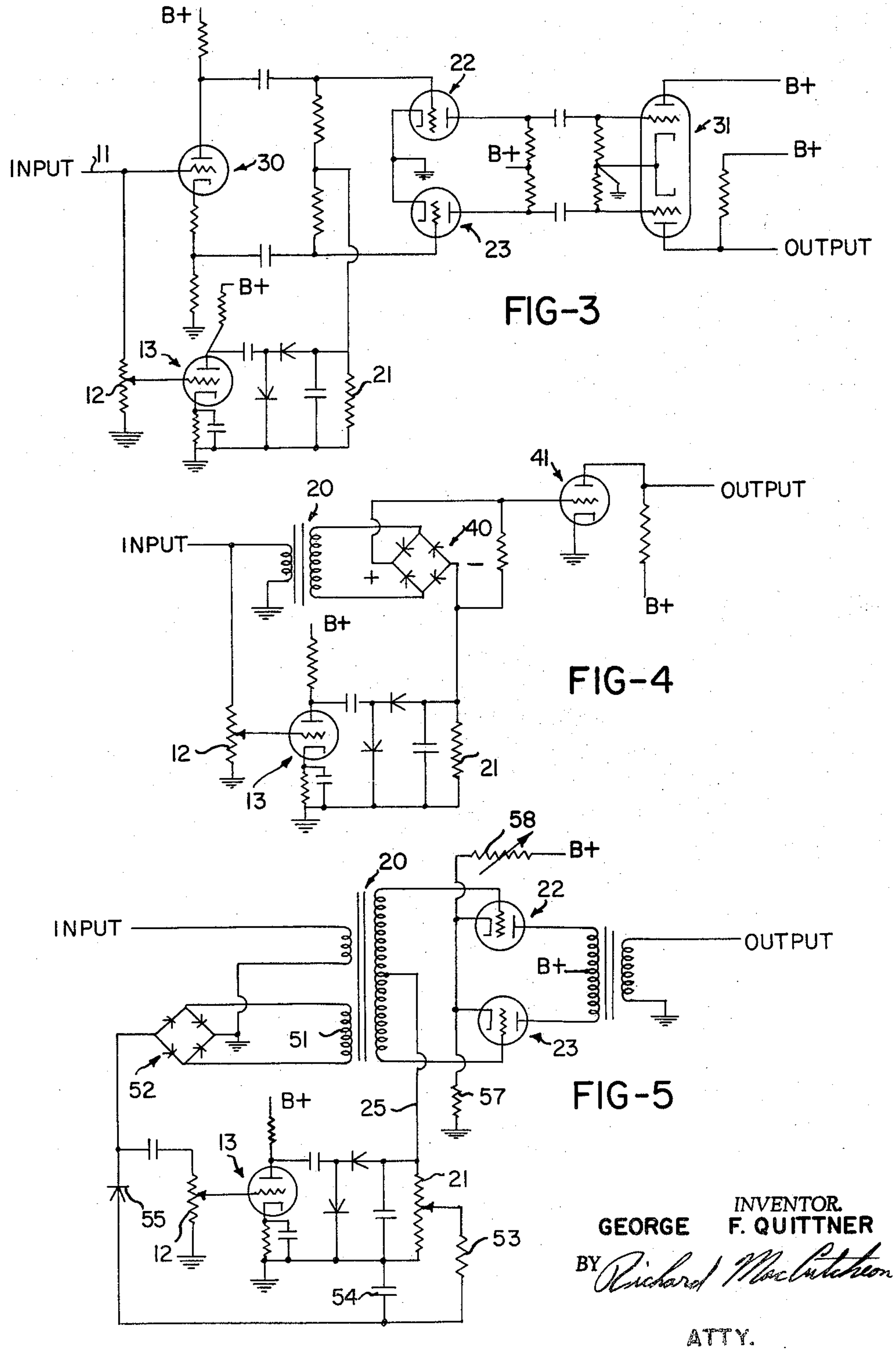
FIGS. 3, 4 and 5 represent modifications.

FIG. 3 shows an alternative arrangement wherein the transformer functions are performed by tubes. Thus a conventional phase splitter tube 30 replaces the input transformer 20 and a difference amplifier comprising a double triode 31 replaces the output transformer 24 of FIG. 2.

Another modification is shown by FIG. 4. Here, in the controllable threshold device portion, the signal is passed through transformer 20 and then full-wave rectified at 40 so that all pulses are in the positive direction, and a single triode 41 serves as the adjustable threshold amplifier.

In operation, with the arrangement as shown in FIG. 2, noise and other signals are amplified by tube 13 resulting in a negative voltage in line 25 with respect to ground. This is applied to the grids of tubes 22 and 23, to which the noise and signals are also supplied in push-pull by the secondary of transformer 20. Only signals which sufficiently exceed the bias level (positively) to bring tube 22 or 23 into conduction will result in output signals from transformer 24. Because of the push-pull conversion, signals of both polarities entering transformer 20 can be passed through the stage, and will be restored to their original polarity relationship at transformer 24. Divider 12 is preferably set to provide sufficient bias to keep noise out of the output but to permit desired flaw signals to pass. Since this divider is adjusted empirically to produced desired effects, and because in a given testing setup it is likely that the noise character (wave shape) will be constant even with amplitude changes, the device ordinarily can correctly follow signal level changes greater than 10 to 1 without further manual adjustment. In the threshold adjusting portion of the circuit (items 12, 13, 14, 15) an amplifier is preferred in order to take care of a wide variety of situations while avoiding loading of the main input circuit.

The arrangement of FIG. 3 operates in more or less similar manner.

The technique illustrated in FIG. 4 sacrifices the flexibility of being able to discriminate positive from negative signals in following stages, but has the advantage of simplicity.

In FIG. 5 the slider of voltage divider 21 permits selection of a suitable fraction of the negative, integrated voltage developed by the incoming noise. Because of the amplifier 13 and subsequent voltage doubler components, the available voltage across divider 21 will be substantially in excess of the noise pulses across the gain adjustment control 12. Additional low pass filtering is readily provided by resistor 53 and capacitor 54. On the anode side of a rectifier diode 55 there is, therefore, a negative voltage proportional to average noise level and adjusted (by the slider of divider 21) to be slightly higher than most of the negative peaks entering from rectifier 52. When noise peaks, or large flaw signals, arrive at diode 55, if they exceed this clipping voltage, they pass through diode 55 and are swamped in the capacitor 54. They cannot greatly add to the voltage developed across divider 21 because they are divided by resistor 53 and the portion of divider 21 between the slider and ground.

FIG. 5 also shows another refinement, which is helpful under some circumstances, in the form of resistors 57 and 58. These provide "hold-off bias." In the absence of these resistors, if the process line is stopped for any reason, the bias across divider 21 will decrease to esentially zero, making amplifier tubes 22 and 23 capable of passing and amplifying the smallest isolated noise pulses freely. To avoid this condition, resistors 57 and 58 hold the bias at some selected lever so the amplifiers can pass nothing. Only when the process line has been restarted and is again capable of producing flaw signals will signals become large enough to exceed the bias. Many other methods of providing hold-off bias are well-known, such as the return of the grounded end of resistor 21 to an adjustable negative voltage instead of ground, or the use of a zener diode in the cathode grounding lead of tubes 22 and 23, and the use of resistors 57 and 58 merely illustrating one embodiment of the described refinement.

With the arrangement of all of FIGS. 1–5 the integrator serves to keep flaw signals (which, compared to noise, are random) from seriously affecting the main amplifier bias. If, in any case, it is desirable to have the control bias less affected by flaw signal, the integrator time constant can be increased by increasing integrator capacity or resistance.

There is thus provided apparatus of the class described capable of meeting the objects of the present invention.

Further changes can obviously be made without departing from the true spirit and scope of the invention which is intended to be defined only by the appended claims taken with all reasonable equivalents.

I claim:

1. Apparatus for detecting a flaw in a sample with relative movement between sample and apparatus, said apparatus having, a first electronic amplifier circuit having a first input connection and having a second input connection which is a threshold bias input connection and said first circuit comprising a push-pull arrangement of electronic devices and connected to be influenced by said connections to pass both positive and negative pulse signals derived from said first input connection when said signals exceed in absolute amplitude a voltage applied to said second input connection, said voltage constituting a threshold adjustment which either a positive or a negative incoming signal must exceed in order to pass through said amplifier, a second amplifier circuit having an input connection which is a signal input connection, parallel input circuitry having broad frequency pass band characteristics capable of passing random noise and connected to take input simultaneously in parallel to said first amplifier circuit first input connection and to said second amplifier circuit input connection, manually adjustable means for regulating the gain of said second amplifier circuit, means for rectifying the output of said second amplifier circuit, means for integrating the rectified output of the second amplifier circuit, means including connections for taking the rectified and integrated second amplifier circuit output to said first amplifier second input connection, and connection means for deriving a useful output from the first amplifier circuit.

2. Apparatus as in claim 1 further characterized by means connected to the input of the second amplifier for clipping exceptionally high peaks from the input to said second amplifier circuit, means for sampling a portion of the rectified and integrated output of the second amplifier circuit, and means for coupling said sampled portion to said means for clipping whereby to automatically adjust the level of clipping action.

3. The combination of claim 1 further characterized by means including a third amplifier input for supplying constant minimum bias to said first amplifier, below which bias value cannot fall even in the absence of amplifier input signals.

References Cited by the Examiner

UNITED STATES PATENTS

| | | | |
|---|---|---|---|
| 2,468,205 | 4/49 | Kellogg | 330—136 X |
| 2,662,940 | 12/53 | Barron | 330—136 X |
| 2,956,237 | 10/60 | Jacobs | 330—136 X |
| 2,959,673 | 11/60 | Magnuski | 330—136 X |

ROY LAKE, *Primary Examiner.*